Aug. 12, 1941.   J. A. LUPFER   2,252,014
INSTRUMENT FOR INDICATING AND RECORDING THE WEIGHT AND
VISCOSITY OF SLUSH USED IN ROTARY DRILLING OF WELLS
Filed March 25, 1936    10 Sheets-Sheet 1

Fig. 1.

James A. Lupfer.
INVENTOR

James A. Lupfer,
INVENTOR

BY
ATTORNEY

Patented Aug. 12, 1941

2,252,014

UNITED STATES PATENT OFFICE 2,252,014

INSTRUMENT FOR INDICATING AND RECORDING THE WEIGHT AND VISCOSITY OF SLUSH USED IN ROTARY DRILLING OF WELLS

James A. Lupfer, Tulsa, Okla.

Application March 25, 1936, Serial No. 70,896

29 Claims. (Cl. 265—11)

This invention relates to indicating and recording instruments and more particularly to an instrument which will continuously record and indicate the weight and viscosity of mud or slush used in rotary drilling of wells.

It is a well-known fact in the art of rotary drilling of deep wells that it is extremely important to maintain a certain predetermined viscosity of the mud or slush used in order to prevent the mud or slush being blown from the hole being drilled with the resultant damage to equipment and possible loss of life or injury to drillers and their helpers.

It is an object of the present invention to provide an instrument which may be connected in the slush line of a rotary drilling equipment for drilling wells by means of which instrument the operator of the equipment may at will readily determine the weight and viscosity of the slush and make any necessary alterations therein for the purpose of insuring the proper weight and viscosity to maintain maximum drilling efficiency and eliminate liability of blowing of the slush from the hole or well being drilled, and also to provide an instrument wherein a recorded record of the weight and viscosity of the slush will be made for reference and computation purposes.

Another object of the invention is to provide in an instrument as specified means whereby the instrument may be thoroughly cleansed either at predetermined intervals automatically, or manually at the will of the operator, for removing any mud or other foreign matter which might cling to the various parts of the mechanism and at the same time record on the record sheet the weight and viscosity of clean water, which record may be employed for the checking and calibration of the instrument.

A further object of the present invention is to provide in an instrument for indicating and recording the weight and viscosity of slush used in the rotary drilling of wells, means for measuring and recording the viscosity of liquid or the slush which includes a tank having a fixed inlet orifice with a fixed head of liquid on the orifice and a plurality of smaller friction tubes which will require a higher static head for the passage of a given quantity of liquid, which static head will vary with the viscosity of the liquid flowing through the tubes; and also to provide means for recording the viscosity of the liquid in the tank and automatic hydraulically operated means for permitting the rapid discharge of high viscosity liquid from the tank for purposes of checking the accuracy of the mechanism by comparison with water.

The invention also comprehends the provision of means for weighing and recording the weight of liquid, which includes a weight tank that will maintain a constant volume of liquid continuously weighed, the total weight of which will be directly proportional to the specific gravity of the liquid in the tank; means for permitting a retarded continuous flow of liquid through the tank; means for preventing any excess quantity of liquid delivered to the tank and overflowing therefrom from running down the sides of the tank, and means for introducing the liquid into the weighing tank so that the velocity of the entering liquid will not be recorded.

A further object of the invention is to provide means which will automatically prevent the registering and/or recording operations of the instrument at any time that an insufficient quantity of slush or liquid is being delivered to or is flowing through the instrument to insure the proper heads upon the respective viscosity measuring and weighing mechanisms.

Another object of the invention is to provide suitable means, preferably in the form of properly located openings for preventing the accumulation of solid matter in the instrument, since such accumulation would give incorrect weight reading or interfere with the accuracy of the viscosity measuring apparatus; and also to provide a novel form of screen for screening the slush or liquid prior to its entrance into the instrument, which screen is so arranged as to prevent its clogging and the consequent stoppage of its operation.

Among other objects of the invention are: the provision of an instrument as specified wherein all of the operating parts coming in contact with the slush or liquid are enclosed in a suitable housing in order to maintain a high humidity of air inside the instrument to prevent the drying out and caking of mud or slush passing through the instrument; the provision for sealing the operating parts of the instrument to prevent tampering by unauthorized persons; and a novel structure for supporting the instrument, whereby it may be maintained level at all times and means forming an inlet connection to the instrument whereby outside vibrations will be prevented from being transmitted to the instrument and which connection will also permit the accurate leveling of the instrument.

With these and other objects in view, as may appear from the accompanying specification, the invention consists of various constructions and combinations of parts, which will be first described in connection with the accompanying drawings, showing an instrument for indicating and recording the weight and viscosity of slush used in rotary well drilling of the preferred form embodying the invention, and the features forming the invention will be specifically pointed out in the claims.

Figure 1:
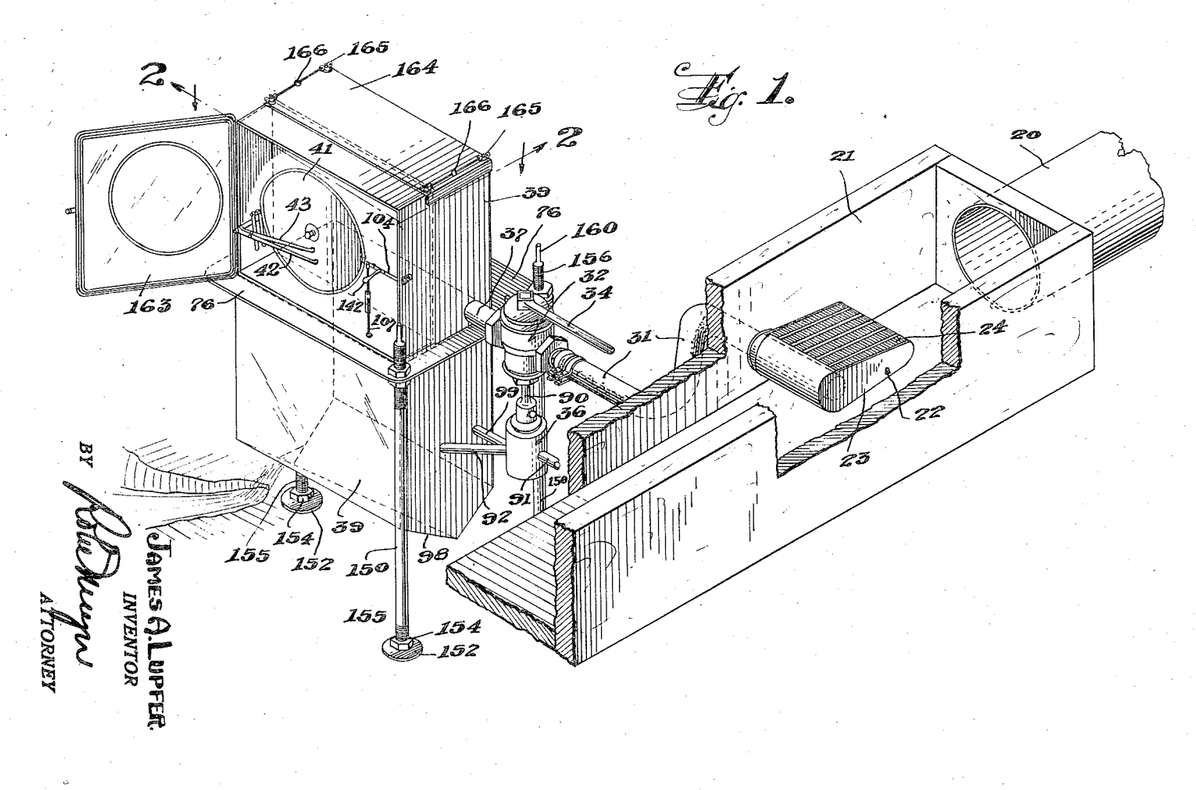
Figure 1 is an isometric drawing of the improved instrument for indicating and recording the weight and viscosity of slush used in the rotary drilling of wells.

The improved instrument for indicating and recording weight and viscosity of slush or similar liquid which forms the present invention is particularly adapted to be connected in the slush or mud line to a rotary drilling equipment for drilling deep wells and the slush line or pipe to the drilling apparatus (not shown) indicated at 20 in Figure 1 of the drawings has an open trough 21 mounted therein at any suitable point.

Figure 17:
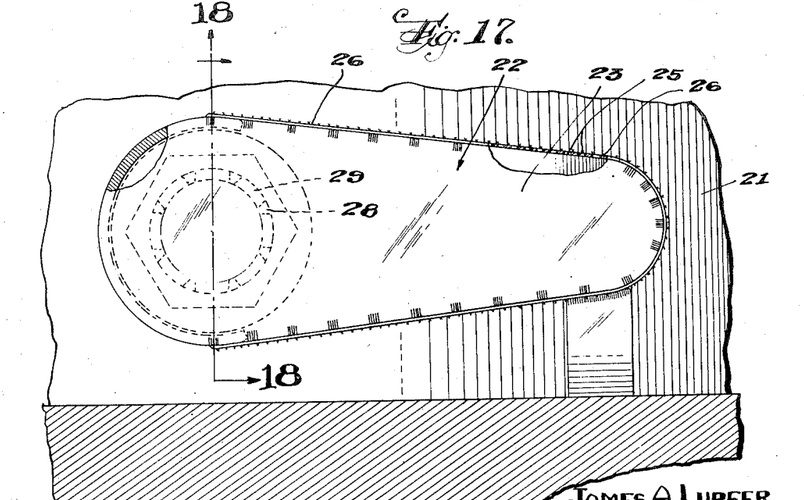
Figures 17 is a side elevation, with parts broken away, cf the screen which screens the slush prior to its entrance into the instrument.
Figure 18:
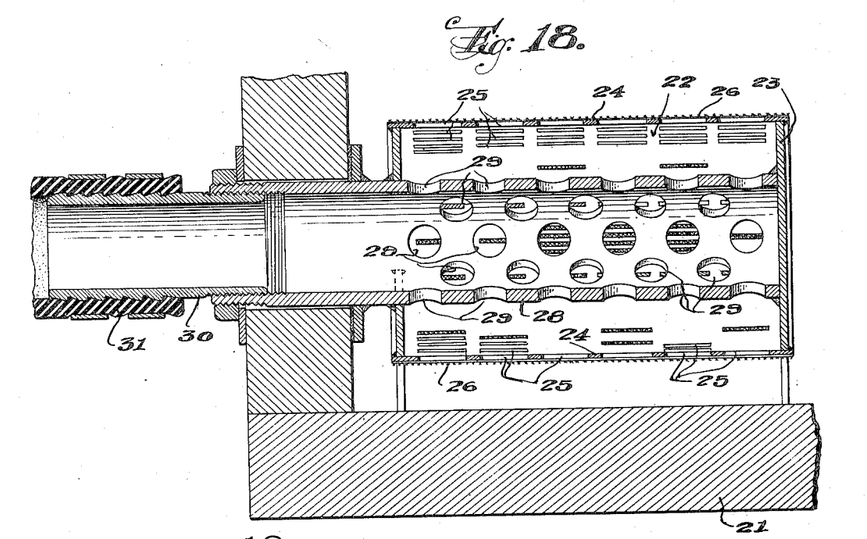
Figure 18 is a vertical cross section through the entrance screen taken on the line 18—18 of Figure 17.

Positioned within the trough 21 is a screen 22 of particular formation, the structure of which is clearly shown in Figures 17 and 18 of the drawings. The screen 22 includes solid end passes 23, the ends of which are rounded and over which is mounted a plate 24. The plate 24 has a plurality of slits or openings 25 formed therein at suitable spaced intervals, and, if it is so desired, a screen as indicated at 26 may be mounted over the outside of the plates. The screen 26 and the foraminous plate 24 are provided to prevent rocks or large particles of foreign matter from passing into the interior of the screen structure 22 for the purpose of preventing the passage of such rocks or solid matter to the indicating and recording instrument.

It will be noted that the screen 22 has its upper and lower flat sides through which the slush passes, inclined upwardly away from the entrance end of the trough and directly in the line of flow of the slush through the trough 21. Thus any particles of solid matter, rocks or the like, will be prevented from accumulating on the flat surfaces of the screen and also will be prevented from clogging the screen. The flow of the slush through the trough will always keep the screen clean.

The screen 22 has a pipe 28 extending transversely therethrough near its end remote from the slush entrance to the trough 23. The pipe 24 is provided with a plurality of spaced holes or openings 29 so that the slush entering the screen and flowing therethrough will pass into the perforated pipe 28 and out through the pipe and the coupling 30 into the hose or flexible connection 31.

Figure 2:
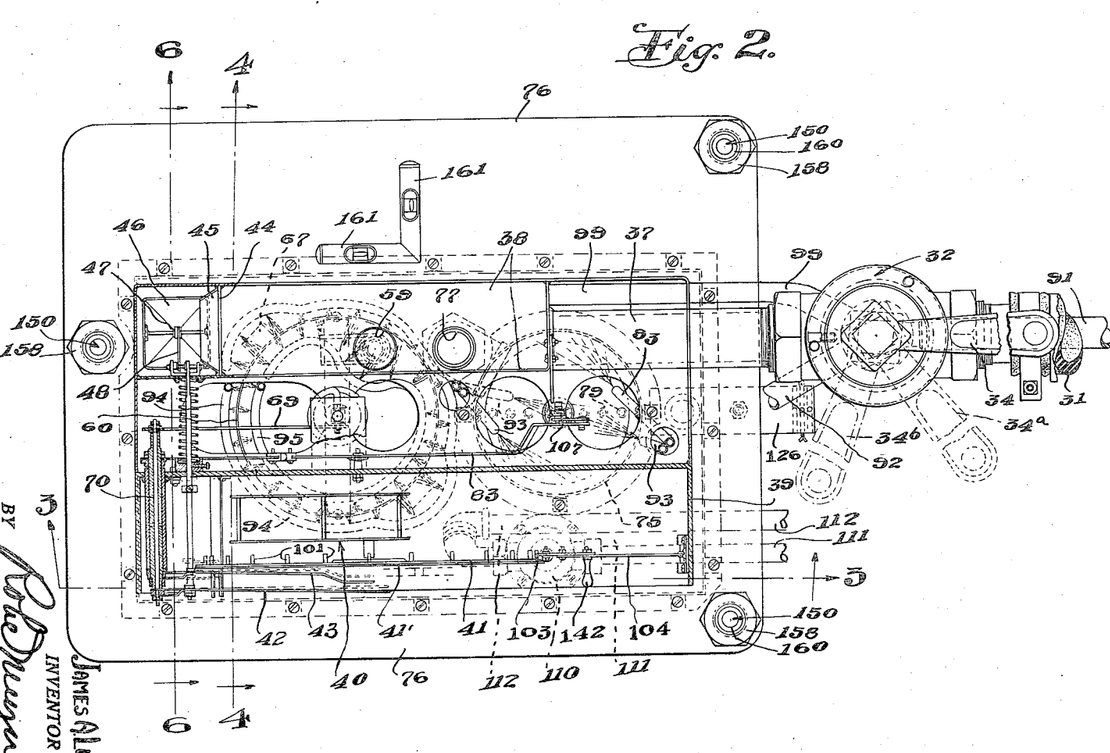
Figure 2 is a horizontal section through the instrument taken on the line 2—2 of Figure 1 or in other words it is a top plan of the instrument with the cover or top of the housing removed.
Figure 9:
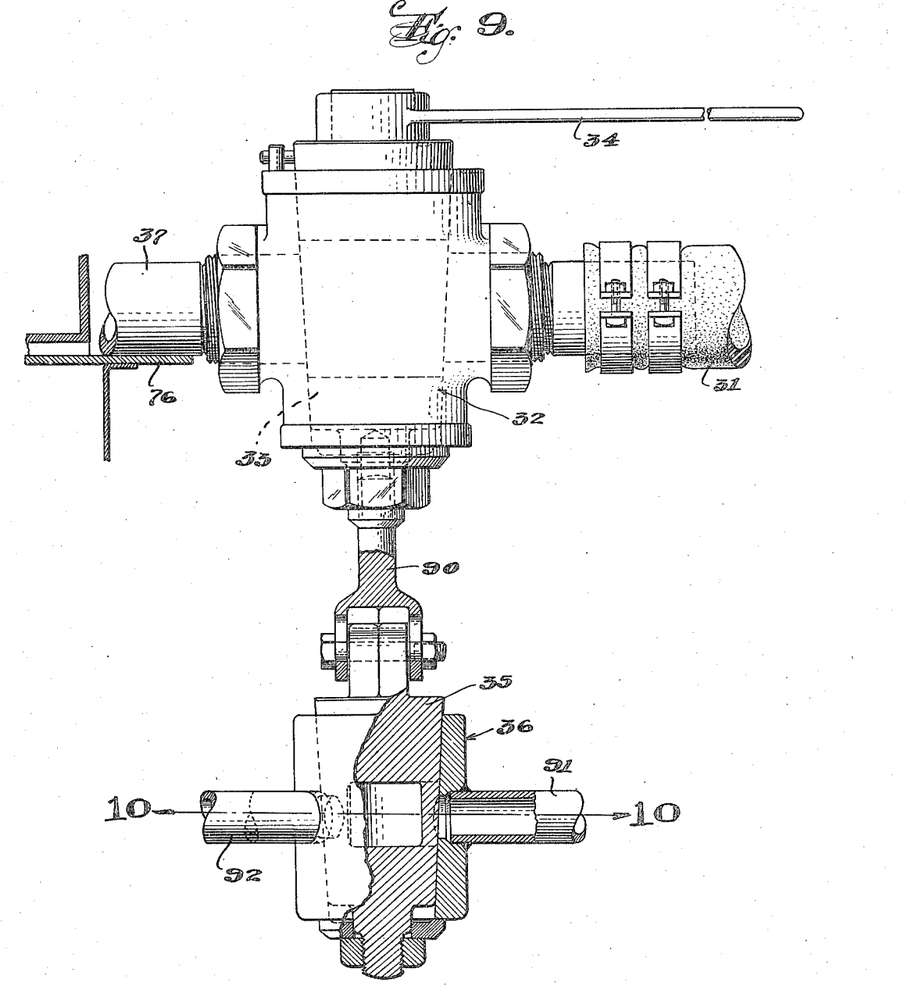
Figure 9 is a view partly in side elevation and partly in section of a manually operated valve mechanism for cutting off the flow of slush through the instrument and permitting the flow of clean water through the instrument.
Figure 10:
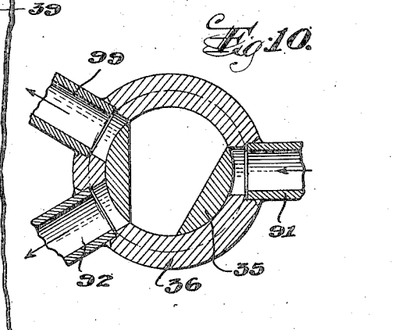
Figure 10 is a horizontal section through a part of the manually operated valve mechanism and taken on the line 10—10 of Figure 9.
Figure 11:
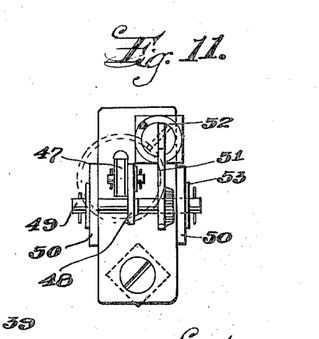
Figure 11 is a fragmentary side elevation of a part of the leverage mechanism of the instrument which mechanism is indicated by the arrow 11 on Figure 6 of the drawings wherein it is shown in side elevation.
Figure 12:
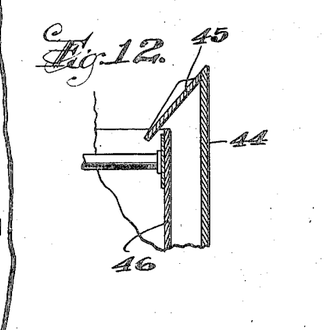
Figure 12 is a detail section taken on the line 12—12 of Figure 6.

In the form of the mechanism embodying the manually operated valve mechanism for controlling the flow of the slush through the instrument, as shown in Figures 1, 2 and 9 of the drawings, the slush flows from the hose 31 into and through the valve mechanism 32. The valve mechanism 32 is of any approved type of cone valve having a rotatable cone 33 therein which controls the flow of the slush to the instrument. An operating handle 34 is connected to the valve cone 33 to permit manual operation of the valve. The valve cone 33 has the cone 35 of the valve structure 36 connected thereto for movement therewith, the purpose of which valve 36 will be specifically set forth hereinafter when its time of operation is reached in the description of the instrument.

From the valve structure 32 the slush flows through the pipe 37 into the trough 38 which extends transversely across the housing 39 which encloses the various operating parts of the instrument.

A recording instrument is enclosed in the housing and this recording mechanism is of any approved type of rotary recording mechanism operated by a clock mechanism 40 which includes the dial 41 on which suitable graduated charts are mounted for receiving the indications or data provided by the mechanism of the instrument. The dial 41 has pens 42 and 43 associated therewith which record or mark on the charts (not shown) carried by the dial 41 the various data provided by the operation of the mechanism.

The liquid or slush flows into the trough 38 from the pipe 37 and the desired proper level of liquid in the trough is maintained by a weir 44. The pipe 37, when the device is operating properly, supplies more slush to the trough 38 than is required by the mechanism and the surplus quantity of slush flows over the weir 44, and over a suitable guide 45 into a control tank 46 which is pendantly hung on a rod 47. The upper end of the rod 47 is pivotally connected to a lever 48 which in turn is mounted on a shaft 49 carried by suitable brackets 50. A lever or arm 51 is also carried by the shaft and has a spring 52 connected thereto which urges the arm 48 and consequently the control tank or bucket 46 upwardly. The shaft 49 is connected by suitable levers or arms 53 to the pens 42 and 43. The control tank or bucket 46 has an opening 54 in its bottom which is considerably smaller than the mouth of the tank or bucket so that during the normal flow of slush through the trough 38 the tank or bucket 46 will be filled with slush. However when the flow of slush fails and a quantity insufficient to accurately operate the mechanism of the instrument is flowing through the trough then no slush will flow over the weir 44 into the tank or bucket 46 and consequently the weight of the bucket will be greatly decreased, which will permit the spring 52 to move the arm 48 and the bucket 46 upwardly and at the same time move the arms 53 to move the pens 42 and 43 out of recording position. Thus when the instrument is not operating with an adequate quantity of slush to insure its accuracy there will be no recordings on the charts indicated at 41' on the dial 41.

An opening 55 in the form of a rectangular slot is provided in the weir at the bottom of the trough which allows excess slush to flow out along the bottom of the trough and any heavy foreign matter and/or stones will be carried along the bottom of the trough and dropped through this opening 55 outside of the weighing tank 60. The opening 55 will prevent any accumulation of stones or any heavy matter in the bottom of the trough and will prevent such stones and other foreign matter from getting into the weighing tank 60 or the viscosity tank 75.

Figures 13, 14, 15, 16:
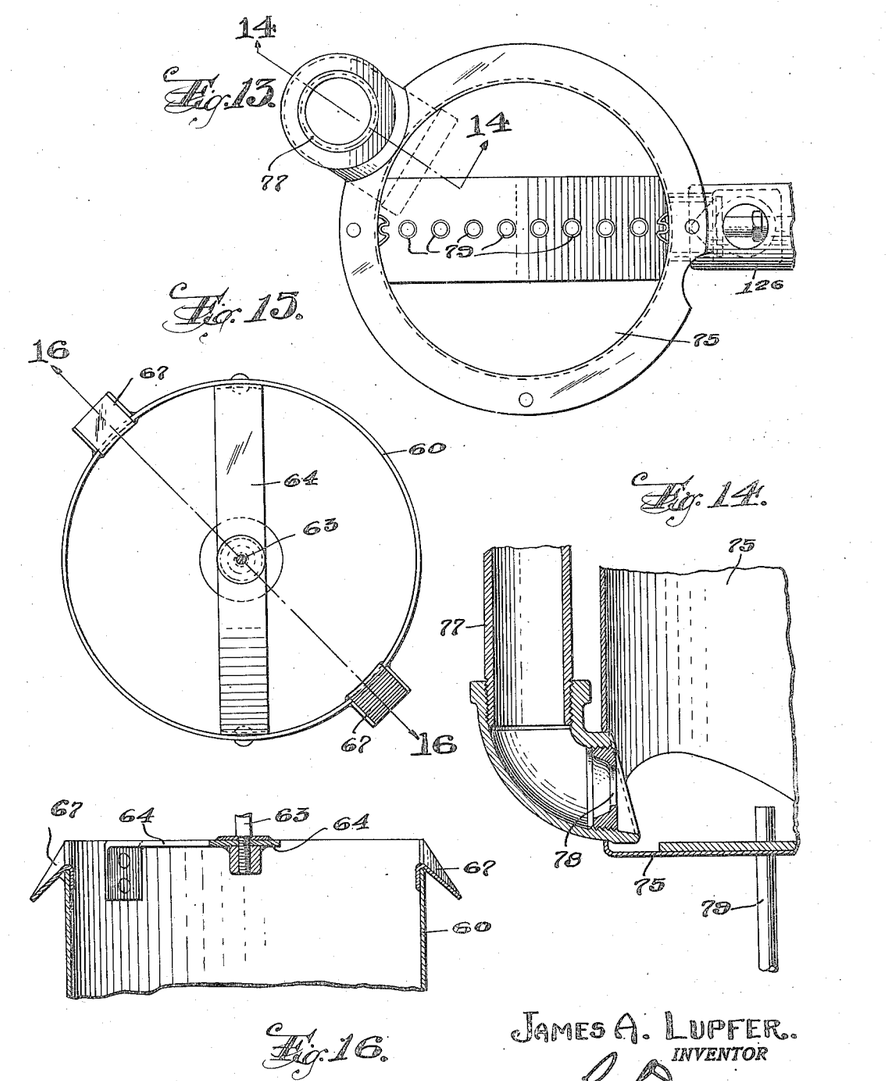
Figure 13 is a top plan of the viscosity measuring tank.
Figure 14 is a detail section taken on the line 14—14 of Figure 13 and showing the fixed entrance orifice for entrance of slush to the tank.
Figure 15 is a top plan of the weighing tank.
Figure 16 is a detail cross-section through the weighing tank taken on the line 16—16 of Figure 15 and showing the overflow spouts therefor.

A suitable deflector plate 57 is mounted in the trough 38 and inclines downwardly transversely across the trough for guiding foreign matter to the opening 55 and also for guiding the slush to the inlet 58 of the feed pipe 59 which delivers slush to the weighing tank 60. The weighing tank 60 is suspended from the top 61 of the housing 39 by a spring 62 and a rod 63 which is connected to the tank 60 by means of a cross-piece 64 which extends across the top of the tank 60 as clearly shown in Figures 15 and 16 of the drawings.

Figure 3:
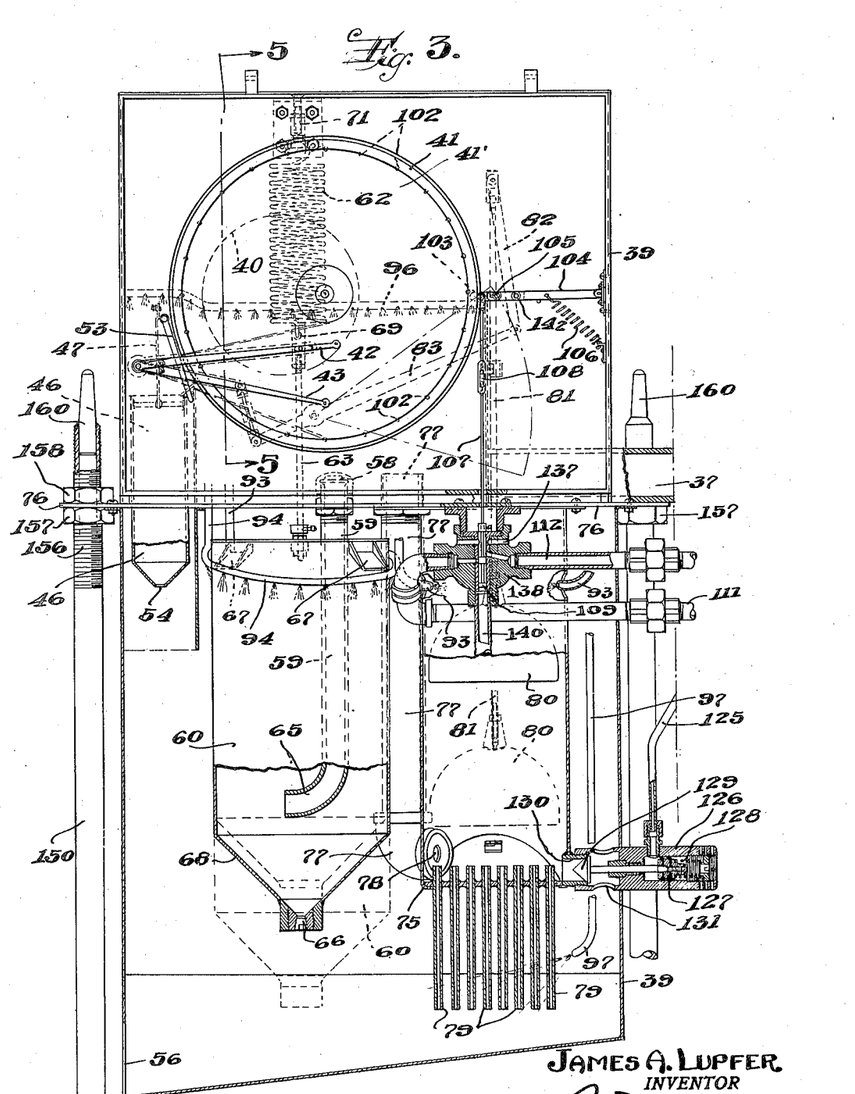
Figure 3 is a vertical section through the instrument taken principally on the line 3—3 of Figure 2 but having parts thereof taken in section along the lines 3A—3A and 8—8 of Figure 4.
Figure 4:
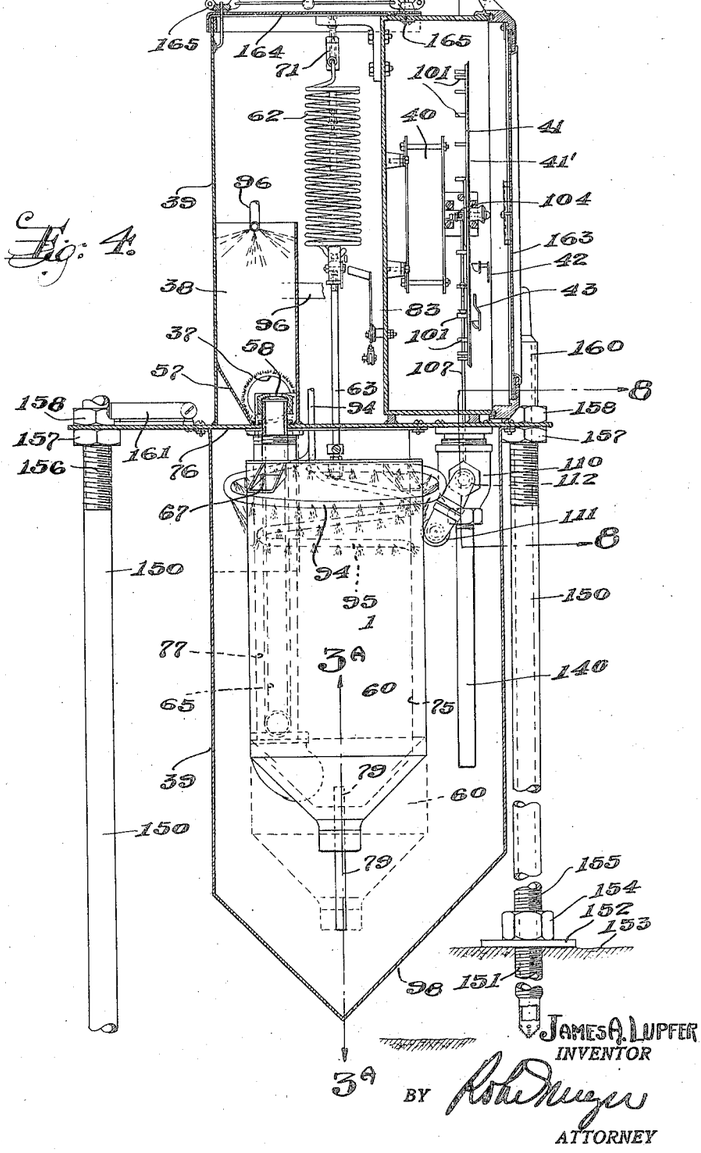
Figure 4 is a vertical cross-section through the instrument taken on the line 4—4 of Figure 2.
Figure 5:
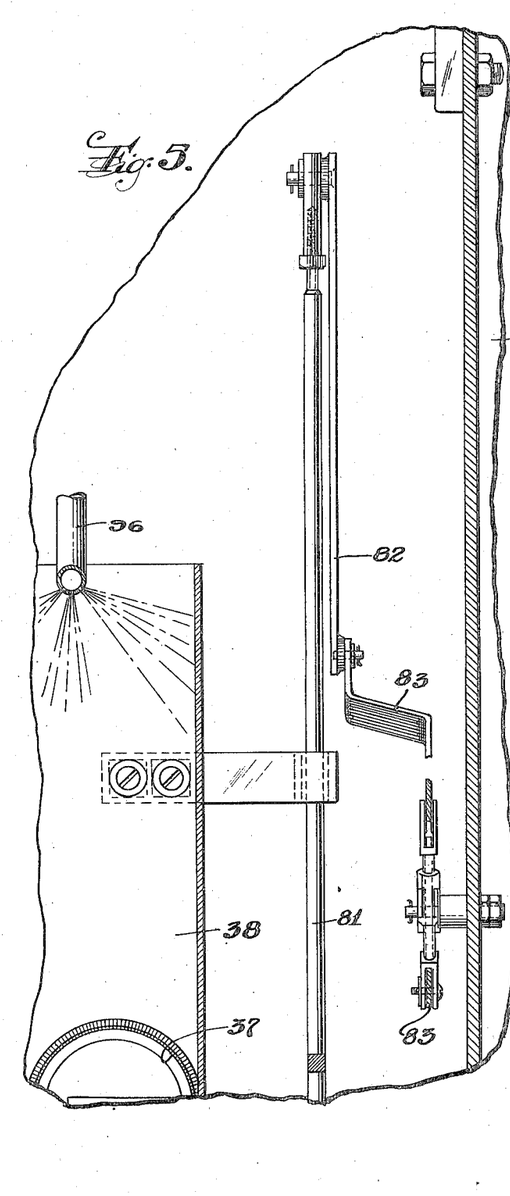
Figure 5 is a fragmentary vertical section taken on the line 5—5 of Figure 3 and having parts removed for the purpose of more clearly illustrating certain other parts of the mechanism.
Figure 6:
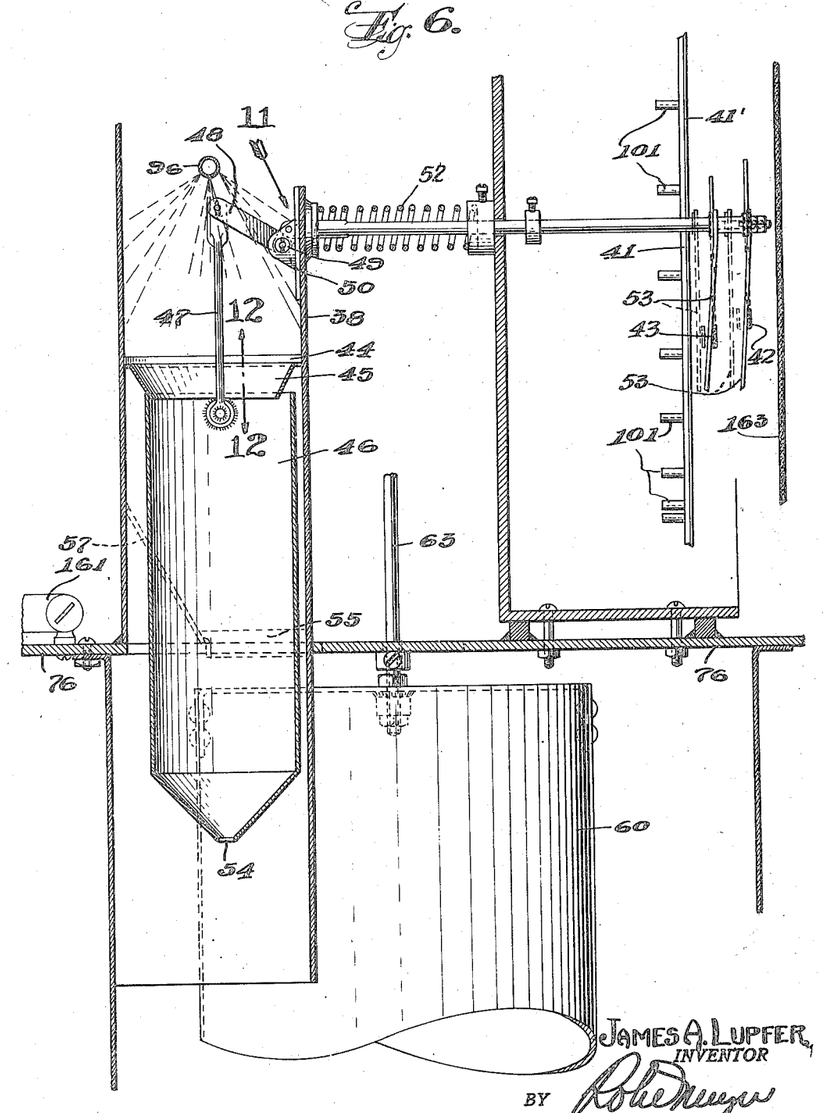
Figure 6 is a vertical section through a part of the mechanism taken on the line 6—6 of Figure 2 and having certain parts of the mechanism left out for the purpose of more clearly illustrating other parts.
Figure 7:
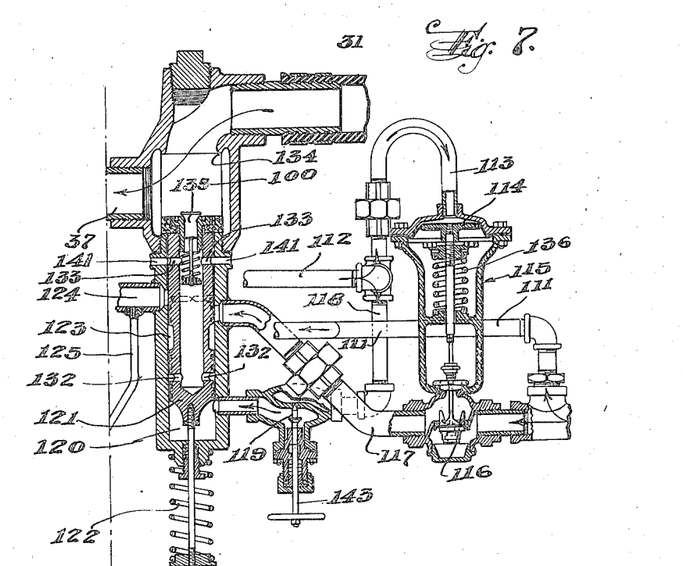
Figure 7 is a vertical section through the automatically operated mechanism employed for cutting off the flow of slush through the instrument and setting up the flow of clean water therethrough.

The upper or receiving end of the pipe 59 extends upwardly into the trough 38 as clearly shown in the drawing, while the main body of the pipe extends downwardly into the weighing tank 60 to a considerable depth having its lower end curved as shown at 65 in Figure 3 of the drawings for delivering the slush or other liquid into the tank in such manner that the velocity of the entering liquid will not register as weight in the weight tank 60.

The weight tank 60 has an outlet orifice 66 at the bottom which is smaller than the inlet orifice 58 at the inlet to the pipe 59. The provision of the smaller outlet orifice 66 will result in the tank 60 being filled with slush at all times, and the slush flowing into the tank 60 faster than it can flow therefrom an overflow from the top of the weight tank will be maintained during the proper operation of the instrument. Troughs 67 are provided at the top of the weight tank 60 and these troughs lead downwardly and away from the outside of the tank 60 a sufficient distance so as to prevent any liquid overflowing from the top of the tank from flowing downwardly along the sides of the tank and being registered as weight.

The entrance orifice 58 being above the bottom of the trough 38 forms a weir and being larger than the orifice 66 in the bottom of the tank 60 will provide the result of a constant volume of liquid in the weight tank, in which case the total weight registered on the chart 41' by the pen 42 will be in direct proportion to the specific gravity of the liquid contained in the constant volume of the weight tank 60. The orifice 66 in the bottom of the weight tank and the tapered bottom 68 of the tank permits the passage of solid particles out of the tank 60 and prevents their accumulation in the weight tank. A system of linkage and levers indicated at 69 and 70, of any approved type as used in connection with indicator pens transmits the movement of the weighing tank 60 to the pen 42 for making a record on the graduated chart 41' on the disc or dial 41.

Any approved type of adjustable means indicated at 71 is provided for regulating the tension of the spring 62 to permit accurate weighing of the slush or other liquid in the weighing tank 60.

A mechanism is provided for determining the viscosity of the slush and this mechanism comprises a tank 75 which is suitably supported, rigidly, from the horizontal partition 76 in the housing 39.

The slush flows to the viscosity tank 75 through an inlet pipe 77. The inlet pipe 77 projects upwardly into the trough 38 above the bottom of the trough to form a weir at the entrance to the pipe. The pipe 77 extends downwardly along the outside of the viscosity measuring tank 75 and passes out through a restricted orifice 78, near the bottom of the tank 75 into the tank. The weir 44 in the trough 38 will maintain a constant level of liquid above the orifice 78 and thereby maintain a constant head of liquid entering the tank 75.

A plurality of tubes 79 are mounted in the bottom of the tank 75 and extend into the tank a short distance above the bottom of the tank. The tubes 79 are smaller in diameter than the inlet pipe 77 and the inlet orifice 78 and the slush flows out of the tank 75 through these small diameter tubes. The increased resistance to the passage of the slush or other liquid through the small diameter tubes 79 will require an increased head on the liquid in order to pass the quantity of liquid flowing in through the inlet orifice 78. Experiments have demonstrated beyond doubt that the height to which the liquid will rise in the viscosity measuring tank 75 due to the increased resistance to flow of the small diameter tube is in proportion to the viscosity of the liquid. A float 80 is placed in the tank 75 and has a rod 81 connected thereto. The upper end of the rod 81 is connected by linkage and levers of any approved construction and arrangement, as indicated at 82 and 83 to the pen-carrying lever 43 which registers, on the chart 41', the position of the float 80 in the viscosity tank. The chart 41' is graduated to permit accurate determining of the viscosity of the liquid in the viscosity tank 75 by the readings on the chart 41'.

Means are provided in the present invention for shutting off the flow of slush or analogous liquid to and through the instrument and at the same time opening the flow of clean water to the instrument for the dual purpose of flushing or cleaning the instrument parts and removing any mud or the like which might have clung thereto and also to permit weighing and measuring the viscosity of clean water and recording the results of such weighing and measuring on the chart 41' which recordings may be used as a calibrating medium for the instrument and permit the checking of its accuracy.

In Figures 1, 2, 9 and 10 of the drawings, a manually operated mechanism for this purpose is shown, while in Figures 3, 4, 6, 7 and 8 an automatic mechanism for providing this work is shown. It is to be understood that either the manually operated mechanism or the automatic mechanism may be employed without departing from the spirit of the present invention.

Taking up the manually operated mechanism first, when the valve operating lever 34 is in the position shown in Figures 1 and 9 and the solid lines in Figure 2, the valve 32 will be positioned to permit the slush to flow through the pipe 37 into the trough 38. However when it is desired to flush or clean the mechanism and check the accuracy of the instrument by means of clean water the handle 34 is first moved into the dotted line position shown at 34a in Figure 2 of the drawings, which will move the valve core 33 to cut off the flow of slush to the instrument and through the medium of the coupling 90 will rotate the cone 35 of the valve 36 through a movement of substantially 53 degrees or thereabouts. The valve 36 is connected by means of a pipe 91 to a supply source (not shown) of clean water under pressure. When the valve cone 35 is moved through the arc of substantially 53° clean water will be admitted through the pipe 92 to the various sprays 93 which deliver clean water in jets or sprays into the viscosity measuring tank 75 and at pressure against its side walls for washing any mud or foreign matter which might have clung to the walls of the tank. The clean water will also be admitted to the spray pipes 94 and 95 which deliver the clean water in jets under pressure against the outside and the inside of the weighing tank 60 respectively for washing mud or other foreign matter from the sides of this tank. The clean water will also be delivered to various other sprays and jets located throughout the housing 39 and indicated at 96 and 97, for thorough washing and cleansing of all of the parts of the mechanism which come into contact with the slush. This water passing through the various tanks 46, 60 and 75 flows into the housing 39 and out of the bottom thereof through the outlet 56. By reference to Figures 1 and 3 of the drawings it will be clearly noted that the bottom 98 of the tank 39 enters both laterally and longitudinally towards the outlet 56 to permit thorough draining thereof.

After all of the various parts of the mechanism have been thoroughly washed or cleansed the lever 34 is moved further, into the dot-and-dash line position shown at 34b in Figure 2 of the drawings at which time the clean clear water will be directed through the pipe 99. The clean or clear water flows from the pipe 99 into the trough from which it flows through the inlets 58 and pipe 77 into the weighing tank 60 and the viscosity measuring tank 75 and over the weir 44 and guide plate 45 into the control tank or bucket 46 so as to provide sufficient weight to permit the recording of the weight and viscosity of the clean water upon the chart 41' carried by the dial 41. After a proper or desired recording of the weight and viscosity of the clean water for purposes of calibration and checking has been had, the lever 34 is again moved into position parallel with the inlet of slush to the trough 38 through the pipe 37 and the normal slush weighing and viscosity measuring operations are again set up.

The mechanism for automatically flushing or cleansing the parts of the instrument with clean water is most clearly shown in Figures 3, 4, 6, 7 and 8 although parts of it are shown in Figure 2 and it is to be understood, of course, that the instrument may be provided with either one or the other of these mechanisms.

In the automatic type of control of the flow of clean water through the instrument, the slush flowing from the hose 31 passes through a valve 100 to the pipe 37 and from the pipe into the trough 38.

The dial 41 which is operated by the clock mechanism 40 has, when this automatic control of clean water is provided, pins 101 inserted in circumferentially spaced recesses or openings 102 in the dial 41 and any number of these pins may be inserted at any suitable places as for instance at points representing hour intervals of the rotation of the dial 41. The pins 101 contact the rounded end 103 of a pivotally mounted arm 104. The arm 104 is formed of two adjustably connected sections as shown at 105 so that its rounded end 103 may be moved into or out of the path of the pins 101. When one of the pins engages the rounded end 103 of the lever 104 it will move this lever against the tension of the spring 106. The arm or lever 104 has a valve-operating rod 107 connected thereto. This rod 107 may have a turnbuckle 108 therein to permit adjustment of its length. When the rod 107 is moved upwardly it will move the piston valve 109 which is mounted in the valve casing 110 upwardly so as to establish communication between the pipe 111, which is connected to any suitable supply source of clean water under pressure, to the pipe 112 allowing the clean water under pressure to flow through the pipe 112 into and through the branch pipe 113 for acting upon the diaphragm 114 of the control valve structure 115, for opening the valve 116 of the control valve and permitting the clean water to flow through the control valve into the pipe 171. At the same time that the clean water under pressure is flowing into the control valve 115 it flows through the branch pipe 118, needle valve structure 119 into the cylinder 120 near the bottom of the cylinder where it acts upon the hydraulically operated piston 121. The piston 121 is slidably mounted in the cylinder 120 and it is normally urged and held in its lower position by means of the spring 122. The clean water under pressure acting on the piston 121 will move the piston upwardly until the annular channel 123 therein communicates with the outlet of the pipe 117. This will let the clean water under pressure flow about the valve piston into the pipe 124 for delivery to the system of sprays 93, 94, 95, 96 and 97 for washing the trough 38 and all of the various mechanisms inside the housing 39. A branch pipe 125 is connected to the pipe 124 and this pipe delivers clean water under pressure into the cylinder 126 of the hydraulically operated means for permitting the quick drainage of heavy viscosity liquid in the tank 75.

The clean pressure water entering the cylinder 126 will act upon the piston 127 forcing it outwardly against the action of its restricting spring 128 and move the valve cone 129 off its seat to open the bottom of the viscosity measuring tank 75 through the coupling 130 to the outlet openings 131. The coupling 130 and the outlet openings 131 are larger than the inlet orifice 78 of the viscosity measuring tank 75 so that when the valve 129 is open the heavy viscosity liquid will quickly drain from the tank 75.

The needle valve structure 119 permits regulation of the speed of travel of the piston valve 121 after valve 121 moves on to close off the flow of slush, the piston 127 moves back to its normal position under action of spring 128 allowing valve 129 to close and causing the cleansing water to be forced out through the sprays.

During the spraying and cleaning operation the piston valve 121 moves upwardly due to the pressure of water and closes the opening to the pipe 37, cutting off the flow of slush to the instrument. When the piston type valve 121 is in its upper slush stopping position, clean water passes into the piston valve through the ports 132 and passes upwardly through the center of the piston type valve 121 which is hollow and out through the openings 133 into the pipe 37 and from thence to the trough 38. The piston valve 121 cuts off the flow of slush by contact of the upper end of the valve with the valve seat 134. The clean water flows from the trough 38 into the various tanks 60 and 75 and the control bucket 46 for permitting the recording of the weight and viscosity of the clear water in the manner heretofore described.

While the clear water is flowing through the openings 133 to the trough 38 the pressure of the water passing through the center of the piston type valve 121 will also unseat the valve 135 which will permit clean water under pressure to flow into and through the flexible coupling or hose 31 into the mud or slush screen 22 thereby cleansing the screen by the clear water flowing outwardly from the inside of the screen.

Figure 8:
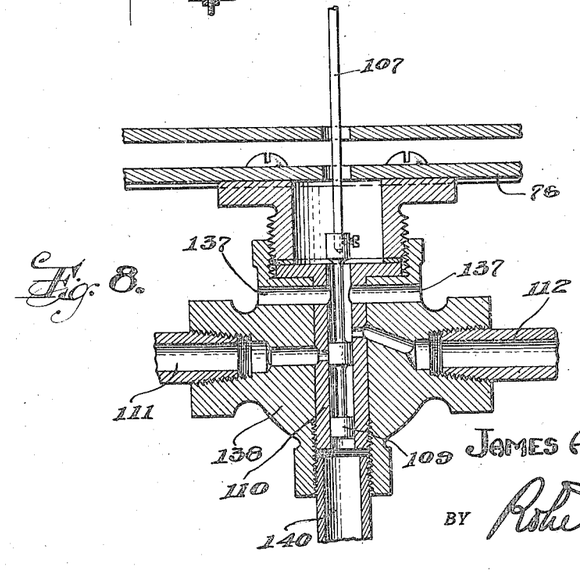
Figure 8 is a detail section, enlarged, taken on the line 8—8 of Figure 4 and showing a valve mechanism which controls the operation of the automatic mechanism illustrated in Figure 7.

After the pin 101 has moved out of engagement with the end of the pivoted arm 104 the spring 106 will return this arm to its normal position which will move the balanced piston valve 109 into position shown in Figure 8 of the drawings, thus cutting off the flow of the clean water under pressure to the control valve 115 and to the cylinder 120. When the flow of the water under pressure is cut off from these two valve mechanisms the spring 136 of the control valve and the spring 122 of the piston type valve will reseat the valve 116 and move the piston type valve 121 into its lower position, respectively, thereby cutting off the flow of the clean water through the instrument.

Suitable drainage openings 137 are provided in the valve housing 138 of the valve 109, and a drain pipe 140 is also provided which permits drainage of any retained clean water from within the parts of this valve mechanism. Also the cylinder 120 is provided with drain openings 141 which will permit the drainage of any clean water from within the cylinder.

A handle 142 is connected to the lever 104 to permit this lever to be raised manually at any time it is desired to operate the various clean water controlling mechanisms without waiting for the operation thereof by any one of the pins 101 carried by the dials 41.

The needle valve 119 is manually operated such as by means of a suitable stem 143, in the usual manner of manual operation of needle valves.

It is necessary in the accurate and efficient operation of instruments of this type that the instrument be supported in such manner that it will be perfectly level and all of the suspended parts will hang truly perpendicular or truly in the manner in which they must hang for efficient operation and in the present invention a novel construction is provided to permit the leveling of the instrument.

The horizontal partition 76 which extends transversely through the housing 39 projects beyond the sides of the housing and it has a three point support provided by means of the standards 150. The standards 150 have suitable embedding points 151 on their lower ends. Contact plates 152 are mounted about the standards and are clamped tightly against the surface indicated at 153 of the ground or the like above which the instrument is mounted by means of nuts 154 which are threaded upon the lower screw-threaded ends 155 of the standards. The upper ends of the standards are also externally screw-threaded as shown at 156 and these screw-threaded portions extend through the horizontal supporting partition 76. Nuts 157 and 158 are threaded upon the threaded portions 156 of the standards 150 and are clamped against the upper and lower surfaces of the horizontal partition 76. If it is so desired, caps as indicated at 160 may be mounted upon the upper ends of the standards 150 for closing the upper ends of these standards if they are made of hollow tubing or for purposes of decoration or for facilitating the rotation of the standards to permit vertical adjustment of the horizontal partition 76 for the purpose of leveling it and supporting the instrument in its proper position. A level 161 which preferably comprises right angular legs, as clearly shown in Figure 2 of the drawings, is mounted on the projecting part of the partition 76 to facilitate the leveling operation. The leveling operation of the instrument is permitted also through the medium of the hose 31 which provides a flexible connection between the instrument and the independent non-adjustable mechanism of the trough 21 and screen 22.

All of the parts of the instrument coming in contact with the slush or mud passing therethrough are enclosed in the housing 39 in order to maintain a high humidity of the air inside of the instrument to prevent the drying out and caking of mud or slush passing through the instrument. A door 163 is provided to permit access to the interior of the upper part of the housing 39 which encloses the clock and recording mechanism to permit the removal and replacement of charts on the dial 41 and also to permit access to the handle 142. Access to the interior of the housing is only through this door 163 and through the removable cover plate 164. Novel means of any suitable type as indicated at 165, are provided to permit the sealing of the cover plate 164 by suitable wire seals of approved type as shown at 166 so as to prevent unauthorized tampering with the mechanism within the housing.

From the foregoing description taken in connection with the accompanying drawings it will be apparent that an instrument has been provided by means of which the weight and viscosity of slush as used in rotary drilling apparatus for drilling wells or that of analogous liquid may be accurately indicated and recorded and that means have been provided in such an instrument to permit checking and calibration of the efficiency as well as means for cleansing it either automatically or manually controlled.

It will be understood that the invention is not to be limited to the specific construction or arrangement of parts shown but that they may be widely modified within the invention defined by the claims.

What is claimed is:

1. In an instrument for indicating and recording the weight and viscosity of slush used in rotary drilling of wells, the combination with means for weighing slush, means for measuring the viscosity of the slush, indicating means connected to said weighing means and said viscosity measuring means, of automatic means for rendering said indicating means inactive upon flow of less than a predetermined quantity of liquid through the instrument.

2. In an instrument for indicating and recording the weight and viscosity of slush used in rotary drilling of wells, the combination with a weighing tank for receiving slush to be weighed, means associated with said tank for weighing slush therein, and indicating and recording means for indicating the weight of slush in the tank, means for delivering slush to said tank, of means for rendering said indicating and recording means inactive on delivery of an inadequate supply of slush to the tank.

3. In an instrument for indicating and recording the weight and viscosity of slush used in rotary drilling of wells, in combination a viscosity measuring tank, inlet means for delivering slush to said viscosity tank having a predetermined size of inlet orifice, a plurality of outlet tubes for slush from said tank of smaller diameter than said inlet orifice whereby a varying static head of liquid will be required for the passage of a given quantity of liquid through the outlet tubes, and automatic means for rendering said recording means inactive upon flow of less than a predetermined quantity of liquid to said viscosity tank.

4. In an instrument for indicating and recording the weight and viscosity of slush used in rotary drilling of wells, in combination a viscosity measuring tank, inlet means for delivering slush to said viscosity tank having a predetermined size of inlet orifice, a plurality of outlet tubes for slush from said tank having openings of smaller cross-sectional area than the cross-sectional area of said inlet orifice whereby a varying static head of liquid will be required for the passage of a given quantity of liquid through the outlet tubes, means for delivering clean water to said viscosity tank, and means for shutting off the flow of slush to said tank upon the delivery of clean water thereto, said viscosity tank provided with an opening to permit rapid discharge of slush from the tank, a valve for closing said opening, means normally holding said valve closed, and means acted upon by pressure of clean cleansing water during the delivery of cleansing water to said tank to open said valve to permit the rapid flow of slush from the tank.

5. In an instrument for indicating and recording the weight and viscosity of slush used in rotary drilling of wells, in combination a viscosity measuring tank, inlet means for delivering slush to said viscosity tank having a predetermined size of inlet orifice, a plurality of outlet tubes for slush from said tank of smaller diameter than said inlet orifice whereby a varying static head of liquid will be required for the passage of a given quantity of liquid through the outlet tubes, means for delivering clean water to said viscosity tank, means for shutting off the flow of slush to said tank upon the delivery of clean water thereto, and automatic means for rendering said recording means inactive upon flow of less than a predetermined quantity of liquid to said tank.

6. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of a delivery trough for delivering slush to said weighing means and said viscosity measuring means, means in said trough to insure a predetermined level of liquid therein, and automatic means for rendering said indicating and recording means inactive when said trough does not receive a predetermined quantity of slush.

7. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of a delivery trough for delivering slush to said weighing means and said viscosity measuring means, means in said trough to insure a predetermined level of liquid therein, a control bucket positioned for receiving slush from said trough, and means connected to said control bucket and said indicating and recording means for rendering the indicating and recording means inactive upon the failure of the flow of liquid into said control bucket.

8. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of a delivery trough for delivering slush to said weighing means and said viscosity measuring means, means in said trough to insure a predetermined level of liquid therein, a control bucket positioned for receiving slush from said trough, means connected to said control bucket and said indicating and recording means for rendering the indicating and recording means inactive upon the failure of the flow of liquid into said control bucket, a housing enclosing said control bucket, and a plurality of adjustable supporting means connected to said housing to permit leveling thereof.

9. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of a plurality of sprays for spraying cleansing water upon said weighing means and said viscosity measuring means, means controlled by said indicating and recording mechanism for controlling the delivery of cleansing water to said sprays, said cleansing water control means acting first to supply clean water to said sprays and subsequently deliver clean water to said weighing means and to said viscosity measuring means, and means for controlling the speed of operation of said clean water controlling means.

10. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of means for delivering clean water in cleansing sprays to said weighing means and to said viscosity measuring means, a valve, means operated by said indicating and recording mechanism for operating said valve, a second valve for controlling the delivery of clean water to said spraying means, said recording mechanism operated valve controlling operation of said second valve.

11. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of means for delivering clean water in cleansing sprays to said weighing means and to said viscosity measuring means, a valve, means operated by said indicating means, a valve, means operated by said indicating and recording mechanism for operating said valve, a second valve for controlling the delivery of clean water to said spraying means, said recording mechanism operated valve controlling operation of said second valve, said second valve acting first to deliver clean cleansing water to said spraying means, and subsequently deliver clean water to said weighing means and said viscosity measuring means.

12. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of means for delivering clean water in cleansing sprays to said weighing means and to said viscosity measuring means, a valve, means operated by said indicating and recording mechanism for operating said valve, a second valve for controlling the delivery of clean water to said spraying means, said recording mechanism operated valve controlling operation of said second valve, said second valve acting first to deliver clean cleansing water to said spraying means, and subsequently deliver clean water to said weighing means and said viscosity measuring means, said second valve acting to cut off the delivery of slush to said weighing means and said viscosity measuring means upon the delivery of clean water to said spraying means.

13. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of means for delivering clean water in cleansing sprays to said weighing means and to said viscosity measuring means, a valve, means operated by said indicating and recording mechanism for operating said valve, a second valve for controlling the delivery of clean water to said spraying means, said recording mechanism operated valve controlling operation of said second valve, said second valve acting first to deliver clean cleansing water to said spraying means, and subsequently deliver clean water to said weighing means and said viscosity measuring means, said second valve acting to cut off the delivery of slush to said weighing means and said viscosity measuring means upon the delivery of clean water to said spraying means, and means for regulating the speed of operation of said second valve.

14. In an instrument for indicating and recording the weight and viscosity of slush used in rotary drilling of wells, the combination with means for weighing slush, means for measuring the viscosity of slush, and indicating and recording means connected to said weighing means and to said viscosity measuring means, of means for delivering clean water in cleansing sprays to said weighing means and to said viscosity measuring means, a valve, means operated by said indicating and recording mechanism for operating said valve, a second valve for controlling the delivery of clean water to said spraying means, said recording mechanism operated valve controlling operation of said second valve, said second valve acting first to deliver clean cleansing water to said spraying means, and subsequently deliver clean water to said weighing means and said viscosity measuring means, said second valve acting to cut off the delivery of slush to said weighing means and said viscosity measuring means upon the delivery of clean water to said spraying means, and means for returning said second valve to its normal position after a predetermined time interval to cut off the flow of clean water and open the flow of slush to the weighing means and the viscosity measuring means.

15. In an instrument for indicating the weight and viscosity of slush used in rotary drilling of wells, the combination with indicating and recording means and an instrument acted upon by slush for operating said indicating and recording means, of means for rendering said indicating and recording means inactive upon flow of less than a predetermined quantity of slush to the instrument, and means to prevent variation in velocity of slush flowing through said instrument from directly affecting operation of said instrument and affecting operation of said indicating and recording means.

16. In an instrument for indicating and recording the weight and viscosity of slush including an openable part, indicating means for indicating the weight and viscosity of slush flowing through the instrument, means for delivering clean flushing water to the instrument, automatic means operated by said indicating means for controlling the flow of flushing water through the instrument, a plurality of jet sprays for cleansing the interior of the instrument, said cleaning water delivering means acting first to deliver clean water to said jet sprays and subsequently to other parts of the interior of the instrument, said automatic means embodying means for cutting off the flow of slush to said instrument upon the flow of clean flushing water thereto and means operated by pressure of the flushing water to open said openable part of the instrument to permit the rapid flow of slush therefrom.

17. In an instrument for indicating and recording the weight and viscosity of slush, a viscosity measuring tank, an inlet pipe for delivering slush to said tank and opening into the tank a short distance upwardly from the bottom thereof, an orifice disk mounted in the outlet of said inlet pipe, a plurality of outlet tubes for slush from the tank extending upwardly into the tank from the bottom thereof to a point substantially on a level with the lower-most position of said inlet orifice, said outlet tubes having smaller cross-sectional opening area than the cross-sectional area of the inlet orifice whereby a varying static head of liquid will be required for the passage of a given quantity of liquid through the outlet tubes.

18. In an instrument for indicating and recording the weight and viscosity of slush, indicating and recording means for indicating and recording the weight and viscosity of slush flowing through the instrument, a delivery trough for delivering slush in the instrument, means in said trough to insure a predetermined level of liquid therein, a control bucket positioned for receiving slush from said trough, means connected to said control bucket and said indicating and recording means for rendering the indicating and recording means inactive upon the failure of flow of liquid into said control bucket, means for delivering clean water to said trough and control bucket for cleansing them, means for controlling the delivery of slush to said trough, means operated by said slush control means for controlling the delivery of clean water to the trough and buckets, and means operated by said indicating and recording mechanism for controlling operation of said slush and clean water control means.

19. In an instrument for indicating and recording the weight and viscosity of slush including an openable part, indicating and recording means for indicating and recording the weight and viscosity of slush flowing through the instrument, a delivery trough for delivering slush in the instrument, means in said trough to insure a predetermined level of liquid therein, a control bucket positioned for receiving slush from said trough, means connected to said control bucket and said indicating and recording means for rendering the indicating and recording means inactive upon the failure of flow of liquid into said control bucket, means for delivering clean water to said trough and control bucket for cleansing them, means for controlling the delivery of slush to said trough, means operated by said slush control means for controlling the delivery of clean water to the trough and buckets, and means operated by said indicating and recording mechanism for controlling operation of said slush and clean water control means, and hydraulically operated automatic means operated upon the delivery of clean water to said trough to operate said openable part to provide rapid discharge of slush therefrom.

20. In an instrument for indicating and recording the weight and viscosity of slush used in rotary drilling of wells, the combination with means for weighing slush and means for measuring the viscosity of slush, of means for delivering clean water in cleansing sprays to said weighing means and to said viscosity measuring means, a control valve, means for operating said control valve, a second valve for controlling the delivery of clean water to said spraying means, said control valve controlling operation of said second valve, said second valve acting first to deliver clean cleansing water to said spraying means and subsequently deliver clean water to said weighing means and said viscosity measuring means, said second valve acting to cut off the delivery of slush to said weighing means and said viscosity measuring means upon the delivery of clean water to said spraying means.

21. In an instrument for indicating and recording the weight and viscosity of slush used in rotary drilling of wells, the combination with means for weighing slush and means for measuring the viscosity of slush, of means for delivering clean water in cleansing sprays to said weighing means and to said viscosity measuring means, a control valve, means for operating said control valve, a second valve for controlling the delivery of clean water to said spraying means, said control valve controlling operation of said second valve, said second valve acting first to deliver clean cleansing water to said spraying means and subsequently deliver clean water to said weighing means and said viscosity measuring means, said second valve acting to cut off the delivery of slush to said weighing means and said viscosity measuring means upon the delivery of clean water to said spraying means, and means for regulating the speed of operation of said second valve.

22. In an instrument for indicating and recording the weight and viscosity of slush used in rotary drilling of wells, the combination with means for weighing slush and means for measuring the viscosity of slush, of means for delivering clean water in cleansing sprays to said weighing means and to said viscosity measuring means, a control valve, means for operating said control valve, a second valve for controlling the delivery of clean water to said spraying means, said control valve controlling operation of said second valve, said second valve acting first to deliver clean cleansing water to said spraying means and subsequently deliver clean water to said weighing means and said viscosity measuring means, said second valve acting to cut off the delivery of slush to said weighing means and said viscosity measuring means upon the delivery of clean water to said spraying means, said viscosity measuring means being provided with an opening for permitting the rapid discharge of slush therefrom, means for normally closing said opening, and means acted upon by pressure of clean water upon opening of said second valve for operating said last-named means to permit the rapid discharge of slush from the viscosity measuring means.

23. In an instrument for indicating and recording the weight and viscosity of slush used in rotary drilling of wells, the combination with means for weighing slush and means for measuring the viscosity of slush, of means for delivering clean water in cleansing sprays to said weighing means and to said viscosity measuring means, a control valve, means for operating said control valve, a second valve for controlling the delivery of clean water to said spraying means, said control valve controlling operation of said second valve, said second valve acting first to deliver clean cleansing water to said spraying means and subsequently deliver clean water to said weighing means and said viscosity measuring means, said second valve acting to cut off the delivery of slush to said weighing means and said viscosity measuring means upon the delivery of clean water to said spraying means, means for regulating the speed of operation of said second valve, normally closed means for permitting the rapid discharge of slush from said viscosity measuring means, said normally closed means being acted upon by pressure of clean water upon the opening of said second valve for opening the means to permit the rapid discharge of slush from said viscosity measuring means.

24. In an instrument for indicating and recording the weight and viscosity of slush used in rotary drilling of wells, the combination with means for weighing slush and means for measuring the viscosity of slush, of means for delivering clean water in cleansing sprays to said weighing means and to said viscosity measuring means, a control valve, means for operating said control valve, a second valve for controlling the delivery of clean water to said spraying means, said control valve controlling operation of said second valve, said second valve acting first to deliver clean cleansing water to said spraying means and subsequently deliver clean water to said weighing means and said viscosity measuring means, said second valve acting to cut off the delivery of slush to said weighing means and said viscosity measuring means upon the delivery of clean water to said spraying means, means for regulating the speed of operation of said second valve, and means for returning said second valve to its normal position after a predetermined time interval to cut off the flow of clean water and open the flow of slush to the weighing means and the viscosity measuring means.

25. In an instrument for indicating and recording the weight and viscosity of slush used in rotary drilling of wells, the combination with means for weighing slush and means for measuring the viscosity of slush, of means for delivering clean water in cleansing sprays to said weighing means and to said viscosity measuring means, a control valve, means for operating said control valve, a second valve for controlling the delivery of clean water to said spraying means, said control valve controlling operation of said second valve, said second valve acting first to deliver clean cleansing water to said spraying means and subsequently deliver clean water to said weighing means and said viscosity measuring means, said second valve acting to cut off the delivery of slush to said weighing means and said viscosity measuring means upon the delivery of clean water to said spraying means, means for regulating the speed of operation of said second valve, normally closed means for permitting the rapid discharge of slush from said viscosity measuring means, said normally closed means being acted upon by pressure of clean water upon the opening of said second valve for opening the means to permit the rapid discharge of slush from said viscosity measuring means, means for returning said second valve to its normal position after a predetermined time interval to cut off the flow of clean water and open the flow of slush to the weighing means and the viscosity measuring means, and means for closing said normally closed means upon the return of said second valve to its normal position.

26. In an instrument for indicating and recording the weight and viscosity of slush, a viscosity measuring tank, inlet means for delivering slush to said viscosity tank having a predetermined size of inlet orifice, a plurality of outlet tubes for slush from said tank of smaller diameter than said inlet orifice whereby a varying static head of liquid will be required for passage of a given quantity of liquid through the outlet tubes, means for delivering clean cleansing water to said tank, said tank provided with a normally closed opening to permit rapid discharge of slush from the tank, and means acted upon by pressure of clean cleansing water for opening said normally closed opening upon delivery of cleansing water to the tank.

27. In an instrument for indicating and recording the weight and viscosity of slush, a viscosity measuring tank, inlet means for delivering slush to said tank and outlet means for slush from said tank, said outlet means constructed whereby a varying static head of liquid will be required for the passage of a given quantity of liquid through the outlet means, means for delivering clean cleansing water to said tank, said tank provided with a normally closed opening to permit rapid discharge of slush from the tank, and means acted upon by pressure of clean cleansing water for opening said normally closed opening upon delivery of cleansing water to the tank.

28. In an instrument for indicating and recording the weight and viscosity of slush, a viscosity measuring tank, inlet means for delivering slush to said tank and outlet means for slush from said tank, said outlet means constructed whereby a varying static head of liquid will be required for the passage of a given quantity of liquid through the outlet means, means for delivering clean cleansing water to said tank, said tank provided with a normally closed opening to permit rapid discharge of slush from the tank, a valve for closing said opening, means normally holding said valve closed, and means acted upon by pressure of clean cleansing water during the delivery of cleansing water to said tank to open said valve to permit the rapid flow of slush from the tank.

29. In an instrument for indicating and recording the weight and viscosity of slush, a viscosity measuring tank, inlet means for delivering slush to said tank and outlet means for slush from said tank, said outlet means constructed whereby a varying static head of liquid will be required for the passage of a given quantity of liquid through the outlet means, means for delivering clean cleansing water to said tank, said tank provided with a normally closed opening to permit rapid discharge of slush from the tank, means for controlling the delivery of clean cleansing water to said tank, a valve for closing said opening, means normally holding said valve closed, a piston connected to said valve, means for delivering cleansing water against said piston for opening said valve by the pressure of cleansing water against said piston, said cleansing water control means controlling the delivery of cleansing water against said piston.

JAMES A. LUPFER.